United States Patent
Yang et al.

(10) Patent No.: US 8,254,562 B2
(45) Date of Patent: Aug. 28, 2012

(54) PORT DETECTION AND PROTECTION CIRCUIT AND ELECTRONIC DEVICE USING THE SAME

(75) Inventors: Yi-Ping Yang, Shanghai (CN); Kun-Shan Yu, Taipei Hsien (TW)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 601 days.

(21) Appl. No.: 12/497,640

(22) Filed: Jul. 3, 2009

(65) Prior Publication Data
US 2010/0278329 A1 Nov. 4, 2010

(30) Foreign Application Priority Data
Apr. 29, 2009 (CN) .......................... 2009 1 0301989

(51) Int. Cl.
*H04M 3/08* (2006.01)
(52) U.S. Cl. ........................... 379/412; 379/2; 379/27.05
(58) Field of Classification Search ................... 379/412
See application file for complete search history.

(56) References Cited

U.S. PATENT DOCUMENTS

| | | | | |
|---|---|---|---|---|
| 3,626,329 A | * | 12/1971 | Larson | 331/113 R |
| 4,486,648 A | * | 12/1984 | Grasso | 219/501 |
| 4,969,178 A | * | 11/1990 | Chen et al. | 379/33 |
| 5,027,391 A | * | 6/1991 | O'Neill et al. | 379/373.01 |
| 6,870,902 B2 | * | 3/2005 | Angliss et al. | 379/27.06 |
| 2002/0064266 A1 | * | 5/2002 | Kaplan | 379/156 |
| 2004/0165718 A1 | * | 8/2004 | Ramey et al. | 379/377 |

* cited by examiner

*Primary Examiner* — Walter F Briney, III
(74) *Attorney, Agent, or Firm* — Altis Law Group, Inc.

(57) ABSTRACT

A port detection and protection circuit utilizes a voltage detection circuits to output a detection signal according to a voltage difference between the tip signal and the ring signal and utilizes a ring detection circuit to output another detection signal according to a voltage difference between a Subscriber Line Interface Circuit (SLIC) tip signal and a SLIC ring signal signaling an incoming call. In addition, the port detection and protection circuit utilizes at least one logic component to output logic signals according to the detection signals. The port detection and protection circuit further switches a loop of a tip wire, a ring wire and the SLIC on or/and off based on logic signals, and issues an alarm according to the logic signals.

18 Claims, 2 Drawing Sheets

PORT DETECTION AND PROTECTION CIRCUIT AND ELECTRONIC DEVICE USING THE SAME

BACKGROUND

1. Technical Field

The present disclosure relates to a port detection and protection circuit and an electronic device using the same.

2. Description of Related Art

Modems often provide an Asymmetrical Digital Subscriber Loop (ADSL) port and an external Foreign Exchange Station (FXS) port. Users can connect a public switched telephone network (PSTN) line to the ADSL port to browse the Internet, or connect an Internet protocol (IP) phone to the FXS port to communicate via Voice over IP (VoIP). However, the ADSL port and the FXS port have a similar appearance, which can confuse connection thereof. Accordingly, the PSTN line may be erroneously connected to the FXS port, which can damage Subscriber Line Interface Circuits (SLICs) of the modems.

DETAILED DESCRIPTION

Figure 1:
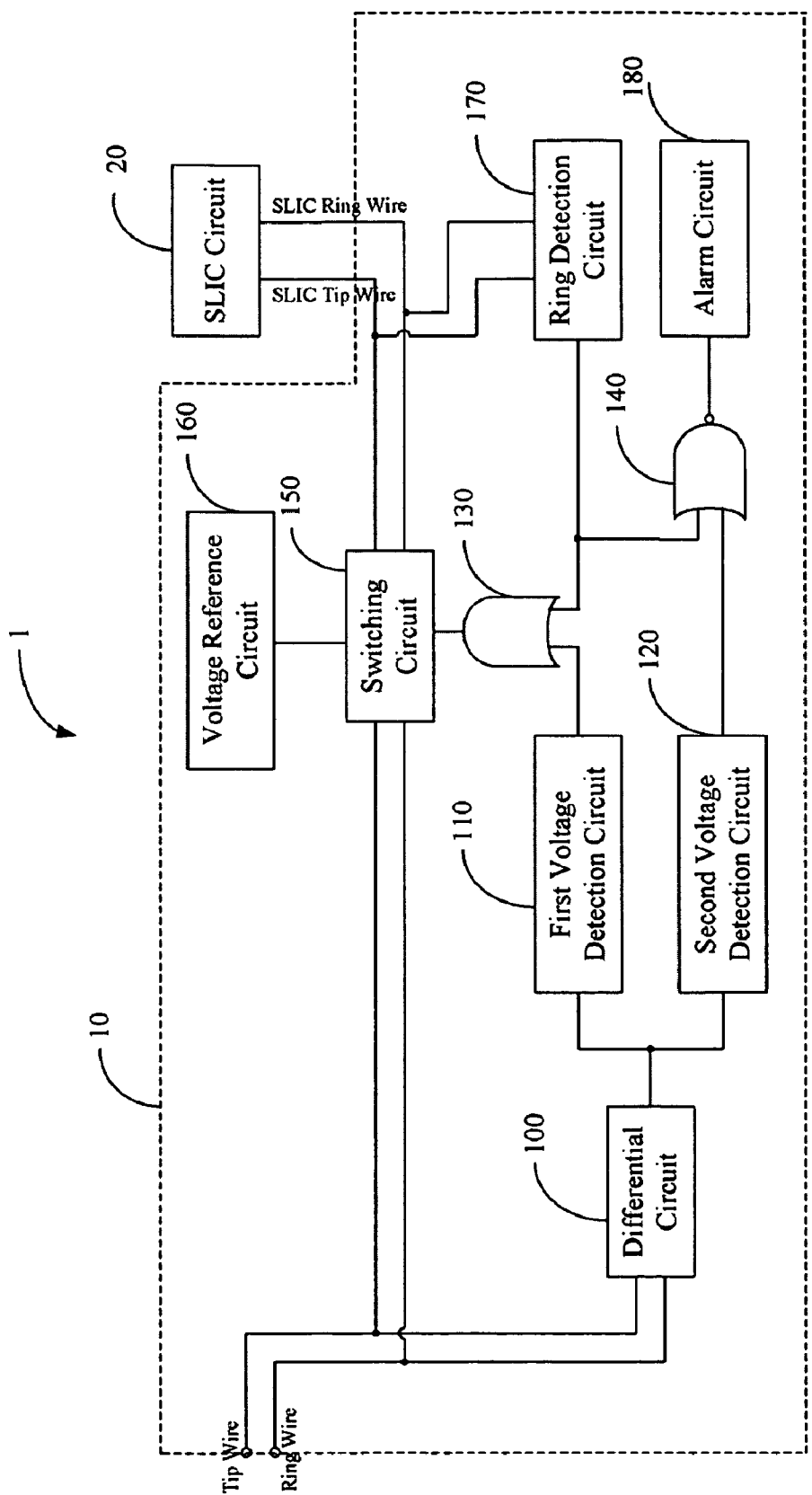
FIG. 1 is a block diagram of one embodiment of an electronic device of the present disclosure.

FIG. 1 is a block diagram of one embodiment of an electronic device 1. The electronic device 1 comprises a port detection and protection circuit 10 and a Subscriber Line Interface Circuit (SLIC) 20. Normally, a telephone line has two wires, such as a tip wire and a ring wire, which transmit a tip signal and a ring signal, respectively. When a telephone line is connected to a Foreign Exchange Station (FXS) port of the electronic device 1, the electronic device 1 is connected to the tip wire and the ring wire. At the same time, the port detection and protection circuit 10 is connected between the tip wire, the ring wire and the SLIC 20 to detect whether an IP phone is connected to the FXS port correctly to ensure the SLIC 20 of the electronic device 1 is not damaged. In one embodiment, the SLIC 20 outputs a SLIC tip signal and a SLIC ring signal. It may be understood that a loop composed of the tip wire, the ring wire and the SLIC 20 is open in a normal state (in an on-hook mode and a non-ringing mode), which is closed only if an IP phone connected between the tip wire and the ring wire is in an off-hook mode and a ringing mode.

In one embodiment, the port detection and protection circuit 10 comprises a differential circuit 100, a first voltage detection circuit 110, a second voltage detection circuit 120, a first logic component 130, a second logic component 140, a switching circuit 150, a voltage reference circuit 160, a ring detection circuit 170 and an alarm circuit 180.

The differential circuit 100 compares the tip signal to the ring signal, and outputs a voltage difference between the tip signal and the ring signal to the first voltage detection circuit 110 and the second detection circuit 120. The first voltage detection circuit 110 determines whether the voltage difference between the tip signal and the ring signal is in a first predetermined voltage range, and outputs a first detection signal according to the determination. The second voltage detection circuit 120 determines whether the voltage difference between the tip signal and the ring signal is outside a second predetermined voltage range, and outputs a second detection signal according to the determination. In other words, the second detection circuit 120 determines whether the voltage difference between the tip signal and the ring signal exceeds the maximum value or falls below the minimum value of the second predetermined voltage range. In one embodiment, the first predetermined voltage range may be about 4.8V~15V, obtained by measuring the voltages several times when the IP phone is connected to the FXS port correctly. The second predetermined voltage range may be about 1.5V~39V (the maximum value thereof may be 39V and the minimum value thereof may be 1.5V), obtained by voltages measured several times when the ADSL line is connected to the FXS port incorrectly.

The ring detection circuit 170 is connected to the SLIC 20 to determine whether there is an incoming call according to a voltage difference between the SLIC tip signal and the SLIC ring signal, and outputs a third detection signal according to the determination. The first logic component 130 outputs a first logic signal according to the first detection signal and the third detection signal. The second logic component 140 outputs a second logic signal according to the second detection signal and the third detection signal. The switching circuit 150 is connected between the tip wire, the ring wire and the SLIC 20, to switch the loop composed of the tip wire, the ring wire and the SLIC 20 on and/or off according to the first logic signal. The alarm circuit 180 alarms based on the second logic signal. The voltage reference circuit 160 is connected to the switching circuit 150, to provide a reference voltage, such as about 18V, to the tip wire and the ring wire.

When the IP phone is connected to the FXS port correctly and is in the off-hook mode, the IP phone connected between the tip wire and ring wire acts as a resistor (e.g., 600'Ω), and forms a loop with the voltage reference circuit 160 and the switching circuit 150. At this time, the voltage reference circuit 160 and the tip wire, the ring wire provides voltage signals to the differential circuit 100. In this instance, the voltage difference between the tip signal and the ring signal is in the first predetermined voltage range, and the first voltage detection circuit 110 outputs a high logic level, such as a logical 1. In addition, the voltage difference between the tip signal and the ring signal does not exceed the maximum value, nor does it fall below the minimum value of the second predetermined value. Similarly, the second voltage detection circuit 120 outputs a high logic level.

The ring detection circuit 170 determines whether there is an incoming call. If there is an incoming call, the ring detection circuit 170 outputs a high logic level. Otherwise, the ring detection circuit 170 outputs a low logic level, such as a logical 0. In one embodiment, the first logic component 130 can be an OR Gate, and the second logic component 140 a NOR Gate. Thus, irrespective of the presence of an incoming call, the first logic component 130 outputs a high logic level to control the switching circuit 150 to switch on the loop composed of the SLIC 20, the tip wire and the ring wire, and the second logic component 140 outputs a low logic level to disable the alarm circuit 180.

When the IP phone is in the on-hook mode, a loop composed of the tip wire, the ring wire, the voltage reference circuit 160 and the switching circuit 150 is open. Thus, the voltage difference between the tip signal to the ring signal may be about 18V provided by the voltage reference circuit 160, which is not in the first predetermined voltage range, and also does not exceed the maximum value and not fall below the minimum value of the second predetermined voltage range. Therefore, the first voltage detection circuit 110 outputs a low logic level, and the second voltage detection circuit 120 outputs a high logic level.

In this instance, if there is an incoming call, the ring detection circuit 170 outputs a high logic level. Thus, the first logic component 130 also outputs a high logic level, and the switching circuit 150 switches on the loop composed of the SLIC 20, the tip wire and the ring wire to provide communication over VoIP. The second logic component 140 outputs a low logic level to disable the alarm circuit 180. If there is no incoming call, the ring detection circuit 170 outputs a low logic level. Thus, the first logic component 130 outputs a low logic level, and the switching circuit 150 cuts off the loop composed of the SLIC 20, the tip wire and the ring wire. The second logic component 140 also outputs the low logic level to disable the alarm circuit 180.

The second logic component 140 controls the alarm circuit 180 to emit an alarm based on both the second detection signal and the third detection signal. When there is an incoming call, a voltage thereof exceeds the maximum value of the second predetermined voltage range. In this instance, the third detection signal output from the ring detection circuit 170 disable the alarm circuit 180 when the electronic device 1 is working normally. The switching circuit 150 may be connected to the SLIC 20 only when the electronic device 1 is operating normally, and in other situations, the switching circuit 150 is connected to the voltage reference circuit 160.

If the ADSL line is connected to the FXS port incorrectly, the voltage difference between the tip signal and the ring signal may be about 48V. The loop composed of the voltage reference circuit 160, the switching circuit 150, and the tip wire, the ring wire is open, and the voltage difference between the tip signal and the ring signal is output to the difference circuit 100 directly. The voltage difference between the tip signal and the ring signal is not in the first predetermined voltage range, however, neither exceeding the maximum value nor falling below the minimum value of the second predetermined voltage range. Thus, both the first voltage detection circuit 110 and the second voltage detection circuit 120 output low logic level.

In one embodiment, the port detection and protection circuit 10 determines whether the IP phone is connected to the FXS port correctly firstly. Once incorrect connection of the ADSL line to the FXS port is detected, the second logic component 140 outputs a high logic level to direct the alarm circuit 180 to emit the alarm, and the first logic component 130 connects the switching circuit 150 to the voltage reference circuit 160. An incoming call signal once after the ADSL line connects to the FXS port incorrectly drives the first logic component 130 to output a high logic level. Thus, the switching circuit 150 is connected to the SLIC 20. Because the voltage of the incoming call exceeds about 48V, no current can flow from the tip wire, the ring wire to the SLIC 20 to ensure the SLIC 20 not damaged. The second logic component 140 outputs a low logic level, disabling alarm circuit 180 until the ringing signal stops.

Although the alarm circuit 180 produces no alarm when the IP phone is ringing, the alarm circuit 180 instantaneously issue a notification that the electronic device 1 is malfunctioning when the ADSL line is erroneously connected to the FXS port. Namely, the electronic device 1 determines whether the ADSL line is connected to the FXS port incorrectly first, and then determines whether there is an incoming call.

Figure 2:
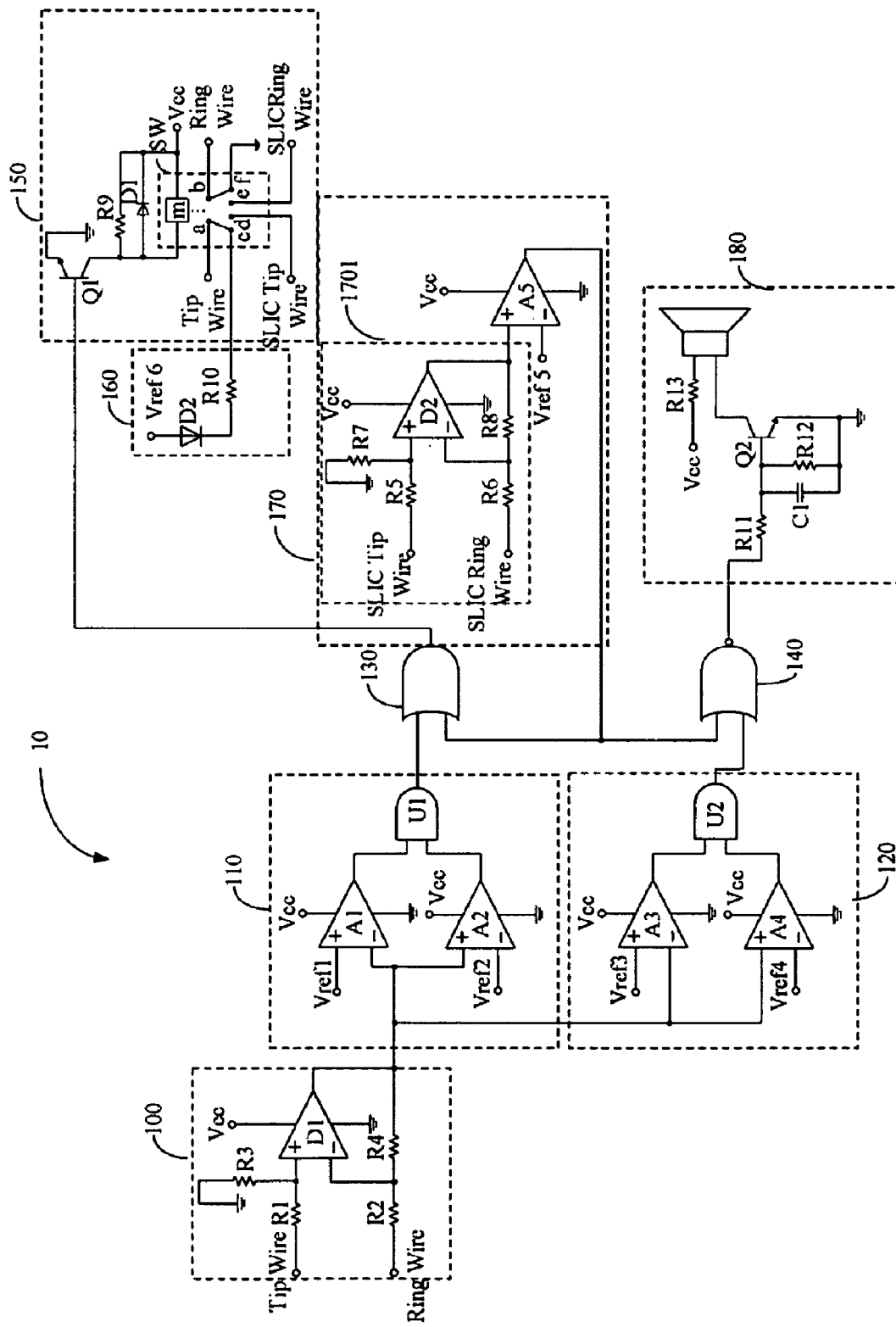
FIG. 2 is a detailed circuit diagram of one embodiment of a port detection and protection circuit of FIG. 1.

FIG. 2 shows a detailed circuit of one embodiment of the port detection and protection circuit 10 of FIG. 1. The differential circuit 100 comprises a plurality of resistors R1, R2, R3, R4 and a first differential comparator D1. A positive input of the first differential comparator D1 is connected to the tip wire via the resistor R1 to receive the tip signal, and a negative input thereof is connected to the ring wire via the resistor R2 to receive the ring signal. An output of the differential comparator D1 outputs the voltage difference between the tip signal and the ring signal. The resistor R3 is connected between the positive input of the first differential comparator D1 and ground. The resistor R4 is connected between the negative input and the output of the first differential comparator D1.

The first voltage detection circuit 110 comprises a first comparator A1, a second comparator A2 and a third logic component U1. A positive input of the first comparator A1 receives a first reference voltage Vref1, such as 15V. A negative input of the first comparator A1 receives the voltage difference between the tip signal and the ring signal output from the differential circuit 100. The first comparator A1 outputs a first comparison signal. A positive input of the second comparator A2 receives the voltage difference between the tip signal and the ring signal, and a negative input thereof receives a second reference voltage Vref2, such as 4.8V. The second comparator A2 also outputs a second comparison signal. The third logic component U1 outputs the first detection signal based on the first and the second comparison signals.

The second voltage detection circuit 120 comprises a third comparator A3, a fourth comparator A4 and a fourth logic component U2. Structures and connections of the second voltage detection circuit 120 are substantially the same as those of the first voltage detection circuit 110, differing in that a positive input of the third comparator A3 receives a third reference voltage, such as about 39V, and a positive input of the fourth comparator A4 receives a fourth reference voltage, such as about 1.5V. Similarly, the third comparator A3 outputs a third comparison signal, and the fourth comparator A4 outputs a fourth comparison signal. Accordingly, the fourth logic component U2 outputs the second detection signal based on the third comparison signal and the fourth comparison signal.

The ring detection circuit 170 comprises a second differential circuit 1701 and a fifth comparator A5. The second differential circuit 1701 comprises a plurality of resistors R5, R6, R7, R8 and second differential comparator D2. Connections of the second differential circuit 1701 are substantially the same as those of the first differential circuit 100, differing in that a positive input of the second differential circuit 1701 receives the SLIC tip signal and a negative input of the second differential circuit 1701 receives the SLIC ring signal.

In addition, a negative input of the second differential comparator A5 receives a fifth reference voltage, such as about 56V, and an output thereof outputs the third detection signal. When there is an incoming call, the fifth comparator A5 outputs a high logic level, otherwise, the fifth comparator A5 outputs a low logic level.

The switching circuit 150 comprises a first transistor Q1, a resistor R9, a first diode D1, a Double-Pole-Single-Throw (DPST) switch SW. In one embodiment, the first transistor Q1 is a common emitter transistor. A base of the first transistor Q1 receives the first logic signal, and an emitter thereof is grounded. A collector is defined as output of the first transistor Q1, and is connected to an external power source Vcc via the resistor R9. An anode of the first diode D1 is connected to the output of the first transistor Q1, and a cathode thereof is connected to the external power source Vcc. The DPST SW comprises a magnetic component m, a first fixed end a, a second fixed end b, a first free end c, a second free end d, a third free end e, a fourth free end f. In one embodiment, the magnetic component m is connected in parallel to the resistor R9. The first fixed end a is connected to the tip wire, and the second fixed end b is connected to the ring wire. The second free end d is connected to the SLIC tip wire, and the third free end e is connected to the SLIC ring wire. The fourth free end f is grounded. When the first transistor Q1 is on, the external power source Vcc discharges via a loop composed of the magnetic component m, the first diode D1 and the first transistor Q1.

The voltage reference circuit 160 comprises a second diode D2 and a resistor R10. An anode of the second diode D2 receives a sixth reference voltage Vref6, such as 18V. The resistor R10 is connected between a cathode of the second diode D2 and the first free end c of the DPST SW. In one embodiment, the resistor may be about 600'Ω.

The alarm circuit 180 comprises a plurality of resistors R11, R12, R13, a capacitor C1, a second transistor Q2 and a loudspeaker. In one embodiment, the second transistor Q2 is also a common emitter transistor. A base of the second transistor Q2 receives the second logic signal output from the second logic component 140 via the resistor R11. An emitter of the second transistor Q2 is grounded, and a collector thereof is connected to the loudspeaker. Additionally, the loudspeaker is connected to the external power source Vcc via the resistor R13. The capacitor C1 and the resistor R12 are connected in parallel between the base of the second transistor Q2 and ground.

In one embodiment, when the electronic device operates normally and the IP phone connected between the tip wire and the ring wire is in off-hook mode, the voltage difference between the tip signal and the ring signal is about 4.8V~15V. Thus, both the first and the second comparators A1 and A2 output high logic level. Especially, the first logic component U1 is an AND gate and the fourth logic component U2 is a NAND gate, both of which thus also output high logic level.

In this instance, irrespective of the presence of an incoming call, that is, whether the fifth comparator A5 outputs a high logic level or a low logic level, the first voltage detection circuit 110 outputs a high logic level and the second voltage detection circuit 120 outputs a low logic level. Accordingly, the first transistor Q1 is on, the external power source Vcc provides energy to a loop composed of the magnetic component m, the first diode D1, the resistor R9 and the first transistor Q1. Magnetic force generated when current flows through the magnetic component m forces the first fixed end a to connect to the free end d of the DPST SW and the second fixed end b to connect to the third free end e of the DPST SW. Thus, the switching circuit 150 causes the tip wire and the ring wire to connect to the SLIC tip wire and the SLIC ring wire of SLIC 20 correspondingly. Commensurately, the second transistor Q2 is off due to the second logic component 140 outputting the low logic level, and thus, a loop composed of the external power source Vcc, the loudspeaker and the first transistor Q1 is opened. Therefore, the loudspeaker issues no alarm.

When the IP phone is in the on-hook mode, the voltage difference between the tip signal and the ring signal may be about 18V. The first voltage detection circuit 110 outputs a low logic level, and the second voltage detection circuit 120 outputs a high logic level. If there is an incoming call, the first logic component 130 outputs a high logic level. Thus, the switching circuit 150 causes the tip wire and the ring wire to connect to the SLIC tip wire and the SLIC ring wire of SLIC 20 correspondingly. Similarly, the second transistor Q2 is off due to the second logic component 140 outputting the low logic level, and thus, a loop composed of the external power source Vcc, the loudspeaker and the first transistor Q1 is opened. Therefore, the loudspeaker issues no alarm.

If there is no incoming call, the first logic component 130 outputs a low logic level. Thus, the first transistor Q1 is off, and no current flows through the magnetic component m. Correspondingly, no magnetic force is generated. Therefore, the switching circuit 150 cuts the tip wire and the ring wire connection to the SLIC tip wire and the SLIC ring wire of SLIC 20 correspondingly. Similarly, the second logic component 140 outputs a low logic level, thus, the alarm circuit 180 issues no alarm.

When the electronic device 1 is abnormal, the voltage difference between the tip signal and the ring signal may be about 48V, outside the first predetermined voltage range 4.8V~15V, and exceeding the maximum value of the second predetermined voltage range 39V. Thus, both the first and the second comparators A1 and A2 output a low logic level. Accordingly, the third logic component U1 outputs a low logic level. Similarly, both the third and the fourth comparators A3 and A4 output a low logic level, and the fourth logic component U2 also outputs a low logic level.

If there is an incoming call, the first logic component 130 outputs a high logic level. Thus, the switching circuit 150 causes the tip wire and the ring wire to connect to the SLIC tip wire and the SLIC ring wire of SLIC 20 correspondingly. However, the voltage of the incoming call exceeds the voltage difference between the tip signal and the ring signal, and the tip signal and the ring signal cant transmit to the SLIC 20, which ensure the SLIC 20 are not damaged. If there is no incoming call, the first logic component 130 outputs a low logic level. Thus, the switching circuit 150 causes the voltage reference circuit 160 to connect to the tip wire and the ring wire to form a loop. That is, the first fixed end a is connected to the first free end c of the DPST SW, and the second fixed end b is connected to the fourth free end f of the DPST SW.

When the electronic device 1 is initially abnormal, the second logic component 140 outputs a high logic level. Thus, the second transistor Q2 is on, and the external power source Vcc provides energy to the loop composed of the resistor R11, the loudspeaker and the second transistor Q2. After the electronic device 1 malfunctions for some time, an incoming call is detected by the ring detection circuit 170 and the second logic component 140 outputs a low logic level. Thus, the alarm circuit 180 stops issuing the alarm.

It is to be noted that polarity of the tip wire and the ring wire can be exchanged, such that voltage difference between the tip signal and the ring signal is positive or negative. Therefore, in alternative embodiments, the voltage difference is lower than 1.5V.

The port detection and protection circuit 10 can be replaced by other circuits with similar function, without limitation thereof. In alternative embodiments, a plurality of voltage dividing circuits may be added before the first and the second differential circuits 100 and 1701, thus, the reference voltages Vref1, Vref2, Vref3, Vref4, Vref5 correspondingly decrease in a voltage dividing ratio. Thus, the comparators A1, A2, A3, A4, A5 can use less costly components.

As described, the loop composed of the tip wire, the ring wire and the SLIC 20t is open when the electronic device 1 is operating normally. Only when the IP phone is in the off-hook mode and is ringing, can the loop be on to prevent an inrush current. In addition, the electronic device 1 uses the port detection and the protection circuit 10 to detect whether the ADSL line is connected to the FXS port correctly, and uses the alarm circuit 180 to notify of such misconnection. At the same time, connections between the tip wire, the ring wire and the SLIC 20 are cut off, ensuring the SLIC 20 of the electronic device 1 is not damaged.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. A port detection and protection circuit, connected between a tip wire, a ring wire and a Subscriber Line Interface Circuit (SLIC), to determine whether an IP phone is connected to a FXS port correctly, wherein the SLIC outputs a SLIC tip signal and a SLIC ring signal, the tip wire and ring wire transmit a tip signal and a ring signal, respectively, and the tip wire and the ring wire are disconnected from the SLIC under normal operation, wherein the port detection and protection circuit comprises:
   a first voltage detection circuit to detect a voltage difference between the tip signal and the ring signal so as to output a first detection signal according to the determination;
   a second voltage detection circuit to detect a voltage difference between the tip signal and the ring signal so as to output a second detection signal according to the determination;
   a ring detection circuit to output a third detection signal according to a voltage difference between the SLIC tip signal and the SLIC ring signal signaling an incoming call;
   a first logic component to output a first logic signal according to the first detection signal and the third detection signal;
   a second logic component to output a second logic signal according to the second detection signal and the third detection signal;
   a switching circuit to switch a loop composed of the tip wire, the ring wire and the SLIC on and/or off based on the first logic signal;
   a voltage reference circuit to provide a reference voltage to the tip wire and the ring wire and to detect the tip wire and the ring wire by the first and the second voltage detection circuits; and
   an alarm circuit to issue an alarm according to the second logic signal;
   wherein each of the first and second voltage detection circuits comprises:
      a first comparator to output a first comparison signal, wherein a positive input of the first comparator receives a first reference voltage, and a negative input of the first comparator receives the voltage difference;
      a second comparator to output a second comparison signal, wherein a positive input of the second comparator receives a second reference voltage, and a negative input of the second comparator receives the voltage difference; and
      a logic component to output a corresponding first voltage detection signal and the second voltage detection signal according to the first and the second comparison signals.

2. The port detection and protection circuit as claimed in claim 1, wherein the first voltage detection circuit determines whether the voltage difference between the tip signal and the ring signal is in a first predetermined voltage range, and the second voltage detection circuit determines whether the voltage difference between the tip signal and the ring signal is not in a second predetermined voltage range.

3. The port detection and protection circuit as claimed in claim 1, further comprising a first differential circuit to compare the tip signal with the ring signal to output the voltage difference between the tip signal and the ring signal to the first and the second voltage detection circuits.

4. The port detection and protection circuit 3, wherein the first differential circuit comprises a first differential comparator to output the voltage difference between the tip signal and the ring signal, wherein a positive input of the first differential comparator receives the tip signal, and a negative input of the first differential comparator receives the ring signal.

5. The port detection and protection circuit as claimed in claim 1, wherein the ring detection circuit comprises:
   a second differential circuit to compare the SLIC tip signal with the SLIC ring signal, and to output the voltage difference between the SLIC tip signal and the SLIC ring signal; and
   a fifth comparator to output the third detection signal, wherein a positive input of the fifth comparator receives the voltage difference between the SLIC tip signal and the SLIC ring signal, and a negative input of the fifth comparator receives a reference voltage.

6. The port detection and protection circuit as claimed in claim 1, wherein the second differential circuit comprises a second difference comparator to output the voltage difference between the SLIC tip signal and the SLIC ring signal, wherein a positive input of the second difference comparator receives the SLIC tip signal, and a negative input of the second difference comparator receives the SLIC ring signal.

7. The port detection and protection circuit as claimed in claim 1, wherein the switching circuit comprises:
   a first common emitter transistor to receive the first logic signal;
   a resistor connected between an output of the first common emitter transistor and an external power source;
   a first diode with an anode of the first diode connected to the output of the first common emitter transistor and a cathode connected to the external power source; and
   a Double-Pole-Single-Throw (DPST), wherein a magnetic component of the DPST is connected between the output of the first common emitter transistor and the external power source, a first fixed end of the DPST is connected to the tip wire, a second fixed end of the DPST is connected to the ring wire, a first free end of the DPST is connected to the voltage reference circuit, a second free end of the DPST is connected to the SLIC tip wire, a third free end of the DPST is connected to the SLIC ring wire, and a fourth free end of the DPST is grounded.

8. The port detection and protection circuit as claimed in claim 7, wherein the voltage reference circuit comprises:
   a second diode with an anode receiving the reference voltage; and
   a resistor connected between a cathode of the second diode and a first free end of the DPST.

9. The port detection and protection circuit as claimed in claim 1, wherein the alarm circuit comprises:
   a second common emitter transistor to receive the second logic signal;
   a loudspeaker connected between an output of the second common emitter transistor and another external power source; and
   a resistor connected between the other external power source and the loudspeaker.

10. An electronic device connected between a tip wire and a ring wire, wherein the tip wire and the ring wire transmit a tip signal and a ring signal correspondingly, comprising:
- SLIC to output a SLIC tip signal and a SLIC ring signal; wherein a loop composed of the tip wire, the ring wire and the SLIC is open under normal operation; and
- a port detection and protection circuit connected between the tip wire, the ring wire and the SLIC, to determine whether an IP phone is connected to a FXS port correctly to ensure the SLIC is not damaged, comprising:
- a first voltage detection circuit to detect a voltage difference between the tip signal and the ring signal so as to output a first detection signal;
- a second voltage detection circuit to detect a voltage difference between the tip signal and the ring signal so as to output a second detection signal;
- a ring detection circuit to output a third detection signal according to a voltage difference between the SLIC tip signal and the SLIC ring signal signaling an incoming call;
- a first logic component to output a first logic signal according to the first detection signal and the third detection signal;
- a second logic component to output a second logic signal according to the second detection signal and the third detection signal;
- a switching circuit to switch a loop comprising the tip wire, the ring wire and the SLIC on and/or off based on the first logic signal;
- a voltage reference circuit to provide a reference voltage to the tip wire and the ring wire and to detect the tip wire and the ring wire by the first and the second voltage detection circuits; and
- an alarm circuit to issue an alarm according to the second logic signal;
- wherein each of the first and second voltage detection circuits comprises:
  - a first comparator to output a first comparison signal, wherein a positive input of the first comparator receives a first reference voltage, and a negative input of the first comparator receives the voltage difference;
  - a second comparator to output a second comparison signal, wherein a positive input of the second comparator receives a second reference voltage, and a negative input of the second comparator receives the voltage difference; and
  - a logic component to output the corresponding first voltage detection signal and the second voltage detection signal according to the first and the second comparison signals.

11. The electronic device as claimed in claim 10, wherein the first voltage detection circuit detects whether the voltage difference between the tip signal and the ring signal is in a first predetermined voltage range, and the second voltage detection circuit detects whether the voltage difference between the tip signal and the ring signal is not in a second predetermined voltage range.

12. The electronic device as claimed in claim 10, further comprising a first differential circuit to compare the tip signal with the ring signal, and to output the voltage difference between the tip signal and the ring signal to the first and the second voltage detection circuits.

13. The electronic device as claimed in claim 12, wherein the first differential circuit comprises a first differential comparator to output the voltage difference between the tip signal and the ring signal, wherein a positive input of the first differential comparator receives the tip signal, and a negative input of the first differential comparator receives the ring signal.

14. The electronic device as claimed in claim 10, wherein the ring detection circuit comprises:
- a second differential circuit to compare the SLIC tip signal with the SLIC ring signal, and to output a voltage difference between the SLIC tip signal and the SLIC ring signal; and
- a fifth comparator to output the third detection signal, wherein a positive input of the fifth comparator receives the voltage difference between the SLIC tip signal and the SLIC ring signal, and a negative input of the fifth comparator receives a reference voltage.

15. The electronic device as claimed in claim 11, wherein the second differential circuit comprises a second difference comparator to output the voltage difference between the SLIC tip signal and the SLIC ring signal, wherein a positive input of the second difference comparator receives the SLIC tip signal, and a negative input of the second difference comparator receives the SLIC ring signal.

16. The electronic device as claimed in claim 10, wherein the switching circuit comprises:
- a first common emitter transistor to receive the first logic signal;
- a resistor connected between an output of the first common emitter transistor and an external power source;
- a first diode with an anode connected to the output of the first common emitter transistor and a cathode connected to the external power source; and
- a Double-Pole-Single-Throw (DPST), wherein a magnetic component of the DPST is connected between the output of the first common emitter transistor and the external power source, a first fixed end of the DPST is connected to the tip wire, a second fixed end of the DPST is connected to the ring-wire, a first free end of the DPST is connected to the voltage reference circuit, a second free end of the DPST is connected to the SLIC tip wire, a third free end of the DPST is connected to the SLIC ring wire, and a fourth free end of the DPST is grounded.

17. The electronic device as claimed in claim 16, wherein the voltage reference circuit comprises:
- a second diode with an anode of the second diode receives a reference voltage; and
- a resistor connected between a cathode of the second diode and a first free end of the DPST.

18. The electronic device as claimed in claim 10, wherein the alarm circuit comprises:
- a second common emitter transistor to receive the second logic signal;
- a loudspeaker connected between an output of the second common emitter transistor and another external power source; and
- a resistor connected between the another external power source and the loudspeaker.

* * * * *